Patented June 25, 1935

2,006,324

UNITED STATES PATENT OFFICE 2,006,324

HYDROQUINONE MANUFACTURE

Joseph Schumacher, Peru, Ill., assignor to Carus Chemical Company, a corporation of Illinois No Drawing. Application November 21, 1934, Serial No. 754,173

6 Claims. (Cl. 260—154)

This invention relates to the manufacture of hydroquinone from crude quinone liquors and, in particular, to the reduction of quinhydrone produced from such impure quinone mixtures.

While solutions of ferrous salts are often used to reduce organic compounds, if added to quinhydrone, the latter is not reduced to hydroquinone because the reaction is readily reversible.

If, however, acid and metallic iron are added to the above reversible reaction mixture, any ferric salt formed is reduced to ferrous salt by the nascent hydrogen liberated and the reduction of the quinhydrone to hydroquinone goes readily to completion with excellent yield and without decomposition products. This reaction has long been used commercially. However, for every mole of quinhydrone reduced, at least one mole of ferrous salt is formed, the separation of which to produce a pure hydroquinone is difficult and expensive.

In order to avoid the large amount of ferrous salt in the reduced solution, Emde in his patent, No. 1,532,800 removes by precipitation the ferric salts formed, reducing the quinhydrone with ferrous sulfate in the presence of an alkaline earth carbonate. The ferric sulfate formed reacts with the alkaline earth carbonate, forming insoluble ferric carbonate, and alkali earth sulfate, leaving the hydroquinone solution free from iron salts. Quinhydrone and hydroquinone, however, are not very stable in neutral solutions, and in the presence of alkaline earth carbonates, a large part of the hydroquinone and quinhydrone break down in insoluble decomposition products of unknown composition.

In his patent, No. 1,540,738, Emde also proposes the reduction of quinhydrone in aqueous solution with metallic iron powder. Here, again, the reduction takes place in a neutral solution. The iron being quite inert, the reaction mixture must be heated to boiling. The decomposition of the hydroquinone and quinhydrone in this hot neutral solution is again large.

In the same patent, Emde also proposes to reduce with iron powder the crude quinone-acid-mixture resulting from the oxidation of aniline. The reduction goes first to quinhydrone and then to hydroquinone. In this reduction not only is a large amount of ferrous sulfate formed, but the solution contains in addition much manganese sulfate (if the oxidation to quinone is carried on with manganese dioxide) or chromic sulfate (if a dichromate is used as the oxidizing agent), together with aniline black resulting from the incomplete oxidation of the aniline. The isolation of a pure hydroquinone from this mixture is difficult.

It has been found that hydroquinone of high purity can be produced in theoretical yield from quinhydrone without the formation of decomposition products and in a solution practically free from foreign salts by reducing the quinhydrone with a soluble ferrous salt, the latter acting in the role of a cyclic catalyst. For example, one liter of the crude oxidation mixture resulting from the oxidation of aniline in the usual manner and containing 75 grams of quinone is distilled under vacuum. The quinone vapors are conducted to and condensed with a cooled hydroquinone solution containing 75 grams of hydroquinone. The quinone vapors are condensed to quinhydrone with a yield of approximately 140 grams. To the quinhydrone mixture measuring about 2 liters, is added 2 grams of ferrous sulfate and 60 grams of iron power. The mixture is agitated and maintained at a temperature of 40° C. or higher. After an hour, the quinhydrone is reduced to hydroquinone and the iron oxide and excess iron is filtered off. The hydroquinone solution is then concentrated and the hydroquinone crystallized out.

In this process, the ferric sulfate formed is regenerated to ferrous sulfate by the iron powder and, therefore, acts as a catalyst. The reaction differs from those where acid and iron are used, in that there is present no acid capable of reacting with iron oxide, and hence the formation of high percentages of ferrous salts is avoided. The iron salts, however, render the reaction mixture sufficiently stable to prevent the decomposition of the quinhydrone and hydroquinone.

During the reduction, some of the iron salts are precipitated as insoluble basic sulfates and tests are preferably made for soluble iron so that, in case of deficiency, more ferrous sulfate may be added. The amount of iron salt is so regulated that at the end of the reaction no iron salts are left in solution, or at most, an inconsequential amount. Instead of ferrous sulfate, iron chloride, acetate, or other soluble iron salt may be used or an equivalent amount of an acid whose iron salts are soluble.

Of course, if acid is used, it will at the beginning of the operation react to form a limited quantity of ferrous salt and thereafter the reaction will proceed as above described, acid radical not being present at least after the start in quantity to react with any iron oxide which may be formed.

The foregoing detailed description is given for clearness of understanding only, and no unnecessary limitations should be understood therefrom, but the appended claims should be construed as broadly as permissible in view of the prior art.

What I claim as new, and desire to secure by Letters Patent, is:

1. In the reduction of quinhydrone to hydroquinone by ferrous salts, the step of reducing ferric salts to ferrous in the presence of hydroquinone by finely divided iron in the absence of free acid capable of uniting with iron or iron oxide.

2. The process of reducing quinhydrone to hydroquinone by reacting quinhydrone with a ferrous salt and regenerating the ferrous salt by reacting the ferric salt formed in the presence of resulting hydroquinone with metallic iron without formation of added soluble iron salts.

3. The process as set forth in claim 2, in which the reduction is carried out in the absence of free acid radicals capable of reacting with iron or iron oxide and any acid solution.

4. In the method of manufacturing hydroquinone from a crude quinone mixture, the steps of distilling the quinone and absorbing it in a hydroquinone solution to form quinhydrone in an amount substantially equal to twice the quinone distilled and subsequently reducing the resultant quinhydrone to hydroquinone by reacting the quinhydrone with a ferrous salt and regenerating the ferrous salt in the presence of resulting hydroquinone by reacting the ferric salt formed with metallic iron in the absence of free acid radicals capable of reacting with iron or iron oxide.

5. The process of producing hydroquinone by distilling crude quinone, condensing the quinone vapors with hydroquinone solution and reducing the resultant quinhydrone to hydroquinone with iron ion in the presence of metallic iron, the amount of iron ion used being less than 5 parts per 100 parts of quinhydrone reduced.

6. In the production of hydroquinone from a crude quinone mixture, the steps of separating quinone from the mixture, reducing the quinone to quinhydrone by admixture with substantially equal amounts of hydroquinone, reducing the resulting quinhydrone to hydroquinone, and reacting substantially one-half of the resulting hydroquinone with additional quinone, whereby substantially one-half of all hydroquinone produced is reconverted to quinhydrone.

JOSEPH C. SCHUMACHER.